(12) United States Patent
Kitagawa et al.

(10) Patent No.: US 6,304,725 B2
(45) Date of Patent: *Oct. 16, 2001

(54) INSTANT CAMERA

(75) Inventors: Kiichiro Kitagawa; Katsuyoshi Asakura, both of Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/258,258

(22) Filed: Feb. 26, 1999

(30) Foreign Application Priority Data

Mar. 5, 1998 (JP) .................................................. 10-053855

(51) Int. Cl.[7] ........................... G03B 17/50; G03B 15/03; G03B 17/26
(52) U.S. Cl. .............................. 396/30; 396/159; 396/517
(58) Field of Search ............................... 396/83–87, 288, 396/30, 61, 159, 161, 164, 213, 226, 228, 33, 367, 583, 86, 411, 34, 517–518; 354/212

(56) References Cited

U.S. PATENT DOCUMENTS

| | | | |
|---|---|---|---|
| 3,241,468 | * | 3/1966 | Wolff ........................................ 396/33 |
| 3,730,065 | * | 5/1973 | Nesson et al. ............................ 95/13 |
| 3,854,812 | * | 12/1974 | Sorli ........................................ 354/312 |
| 3,939,483 | * | 2/1976 | Kuramoto ............................... 396/83 |
| 3,999,202 | * | 12/1976 | Goto ........................................ 354/304 |
| 4,005,446 | * | 1/1977 | Friedman ............................... 354/86 |
| 4,016,578 | * | 4/1977 | Friedman ............................... 354/86 |
| 4,134,655 | * | 1/1979 | Friedman ............................... 354/86 |
| 4,172,650 | * | 10/1979 | Duncan .................................. 354/112 |
| 4,174,164 | * | 11/1979 | Friedman et al. ...................... 354/86 |
| 4,226,519 | * | 10/1980 | Gervais .................................. 396/174 |
| 4,460,254 | * | 7/1984 | Hara et al. .............................. 354/86 |
| 4,823,155 | * | 4/1989 | Kataoka .................................. 396/86 |
| 5,541,683 | * | 7/1996 | Kihara et al. ........................... 354/86 |
| 5,794,077 | * | 8/1998 | Shimizu .................................. 396/30 |
| 5,881,323 | * | 3/1999 | Mizuno et al. ......................... 396/30 |
| 5,946,502 | * | 8/1999 | Douglas .................................. 396/30 |

* cited by examiner

Primary Examiner—Russell Adams
Assistant Examiner—Hung Henry Nguyen
(74) Attorney, Agent, or Firm—Sughrue, Mion, Zinn, Macpeak & Seas, PLLC

(57) ABSTRACT

An instant camera is used with a photo film pack, which includes plural photo film units of a self-processing type. Each of the photo film units includes a processing solution pod for containing processing solution. There is an exposure surface which is exposed by photographic subject light and on which the processing solution is spread for processing. A case contains a stack of the plural photo film units. A photo film outlet causes the photo film units to exit. The instant camera has a pack chamber loaded with the photo film pack. An exposure aperture is formed to open in one face of the pack chamber, and sets the exposure surface of the photo film units inside the photo film pack. A set of first and second spreader rollers press and convey an exposed one of the photo film units advanced from the pack chamber, and squeeze the solution pod to spread the processing solution on the exposure surface. A spread control wall is disposed between the photo film outlet and the spreader roller set, pushes the photo film unit advanced from the photo film outlet, and controls distribution of the processing solution on the exposure surface.

8 Claims, 8 Drawing Sheets

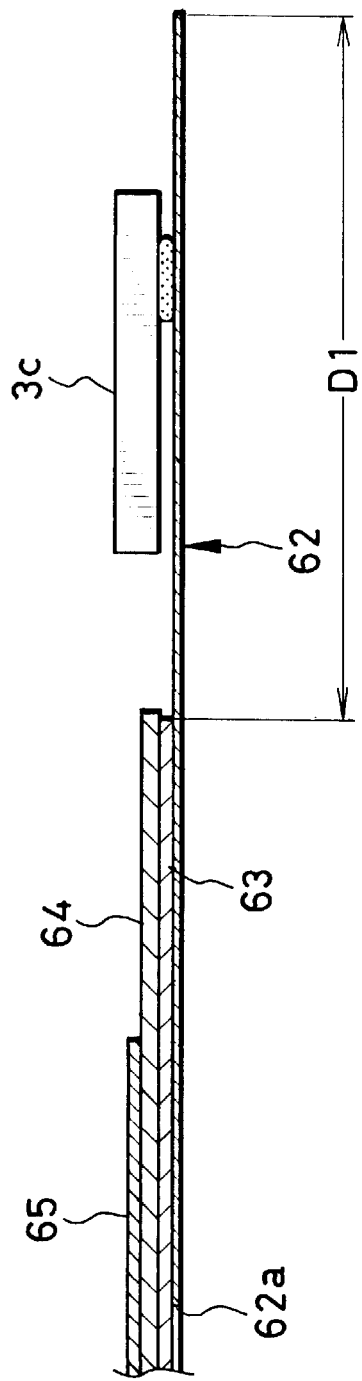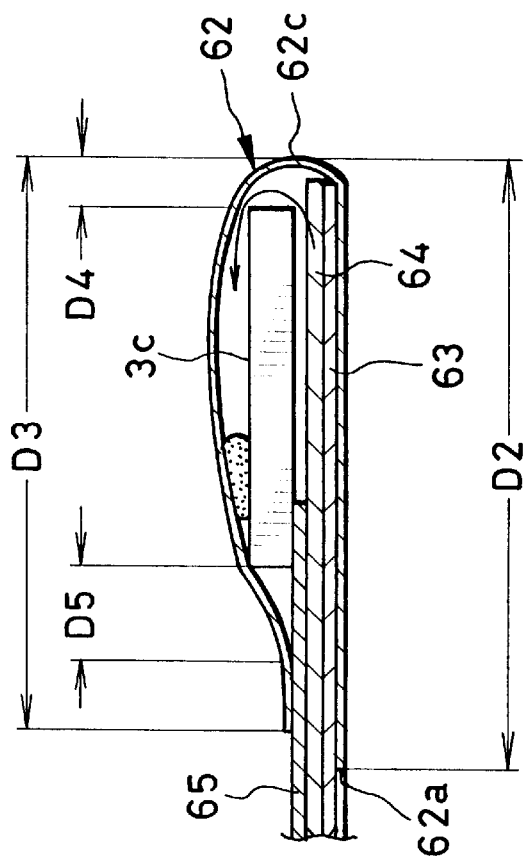
FIG. 5A
FIG. 5B

INSTANT CAMERA

BACKGROUND OF THE INVENTION

1. Field of the Invention

The present invention relates to an instant camera. More particularly, the present invention relates to an instant camera capable of spreading processing solution in each photo film unit in a stably controlled manner.

2. Description Related to the Prior Art

A widely available instant camera is used with a photo film pack, which includes plural photo film units of a self-processing type. Each of the photo film units has an exposure surface, and a processing solution pod disposed on one edge of the exposure surface. The solution pod contains processing solution. The photo film pack has a case of a box shape, which encloses the photo film units light-tightly to be sold as a product. When the instant camera is loaded with the photo film pack, it is possible to take photographs without handling each of the photo film units individually.

When an exposure is taken in an instant camera on the exposure surface of the photo film unit with light from a photographic subject, the camera causes the photo film unit being exposed to moved to the outside. In the course of this exiting movement, a pair of spreader rollers nip and squeeze the solution pod, and causes the processing solution to flow from the solution pod to the exposure surface, to develop the exposure surface.

There are various ways conceivable for improving the quality of a printed image on the photo film unit in the instant camera. Among them, JP-B 3-72975 (corresponding to U.S. Pat. No. 4,226,519) suggests spreading of the processing solution to the exposure surface in a uniform manner. A spread control surface is formed with the photo film outlet in the case to contact the exposure surface in the photo film unit. When the processing solution flows from the solution pod, the spread control surface spreads the processing solution on the exposure surface before the spreader rollers spreads the processing solution. Thus the spread control surface causes the processing solution to extend to lateral portions arranged in the film unit width direction, which would be impossible if the spread control surface were not added to the spreader rollers. According to this prior art, the quality of the printed image can be heightened. Also the cost of the photo film unit can be reduced by optimizing the amount of the processing solution as contained.

To stabilize the effect of the spread control surface controlling the spread of the processing solution, it is necessary to regularize a contacting position, contacting pressure, and other contacting states between the spreader rollers and the spread control surface. The case of the photo film pack consists of a combination of plural parts formed from plastic material with a small thickness, and is likely to be deformed due to irregularities in the size occurring at the molding time or assembly time, and twisting or distortion in the shape according to temperature or the like. A problem lies in that a relative position between the spread control surface with the spreader rollers is likely to change, so as to change the control of spreading the processing solution.

SUMMARY OF THE INVENTION

In view of the foregoing problems, an object of the present invention is to provide an instant camera capable of spreading processing solution in each photo film unit in a stably controlled manner.

In order to achieve the above and other objects and advantages of this invention, an instant camera has a pack chamber loadable with a photo film pack, wherein the photo film pack has a stack of plural photo film units of a self-processing type, a case contains the stack of the photo film units, each of the photo film units includes a solution pod and an exposure surface, the exposure surface is processed by spreading of processing solution from the solution pod after being exposed by photographic subject light, and the photo film units are respectively ejected through a photo film outlet in the case. In the instant camera, a spreader roller set is constituted by first and second spreader rollers, for pressing and conveying an exposed one of the photo film units advanced from the pack chamber, the spreader roller set squeezing the solution pod to spread the processing solution on the exposure surface. A spread control member is disposed between the photo film outlet and the spreader roller set, for pushing the one photo film unit in a first direction substantially perpendicular to an advance thereof during the advance, to control distribution of the processing solution on the exposure surface.

In a preferred embodiment, the pack chamber includes a photo film passageway for passing the one photo film unit advanced from the photo film outlet toward the spreader roller set. The spread control member is one of two walls defined in the photo film passageway, and at least partially covers the photo film outlet.

The spread control member includes an inclined face, disposed on an end thereof, opposed to the photo film outlet, for guiding a front end of the one photo film unit being advanced toward the spreader roller set.

The spread control member is so disposed as to bend the one photo film unit convexly in the first direction between the photo film outlet and the spreader roller set.

Furthermore a camera outlet is disposed outside the spreader roller set, for ejecting the photo film unit externally from the instant camera, the camera outlet being positioned offset from a position between the first and second spreader rollers, to push the one photo film unit in the first direction.

The first spreader roller is movable in the first direction, is biased by a spring, and applies regular force of pressurization to the one photo film unit in cooperation with the second spreader roller. The spread control member is disposed on a side of the first spreader roller with respect to the photo film outlet.

A camera outlet ejects the one photo film unit externally from the instant camera after having passed the spreader roller set, wherein the one photo film unit is bent substantially in an S-shape by the camera outlet, the spreader roller set, the photo film passageway and the photo film outlet while advanced.

In a further preferred embodiment, the photo film units have a size equal to a size of an ID-1 type card defined by JIS X6301 or ISO 7810.

BRIEF DESCRIPTION OF THE DRAWINGS

The above objects and advantages of the present invention will become more apparent from the following detailed description when read in connection with the accompanying drawings, in which:

FIG. 5A is a section, partially cutaway, illustrating a trap section of the photo film unit in the course of manufacture;

FIG. 5B is a section, partially cutaway, illustrating the same as FIG. 5B in a finally manufactured state;

DETAILED DESCRIPTION OF THE PREFERRED EMBODIMENTS OF THE PRESENT INVENTION

Figure 1:
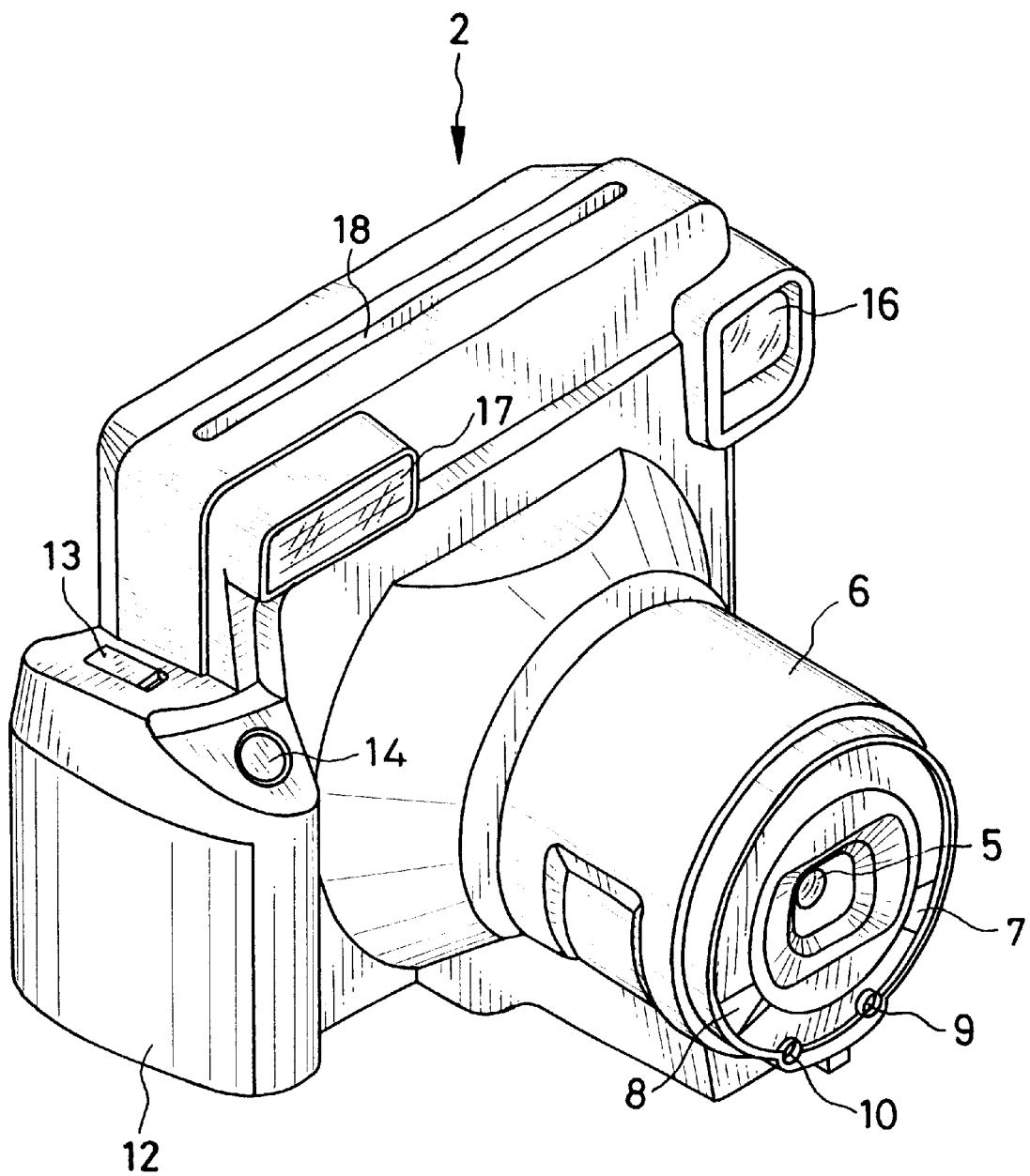
FIG. 1 is a perspective illustrating an instant camera.

In FIG. 1, an instant camera 2 of the present invention has a generally rectangular shape as viewed in the front. The instant camera 2 is loaded with a photo film pack 4 which contains a plurality of photo film units 3. See FIG. 2. A front of the center of the instant camera 2 has a lens barrel 6 incorporating a taking lens 5. The instant camera 2 has an auto-focus (AF) device of an infrared active type. The front of the lens barrel 6 has the taking lens 5, a light projector window 7, a light receiver window 8, a photometric window 9 and a flash measuring window 10. The light projector window 7 and the light receiver window 8 constitute a rangefinding device. The photometric window 9 is included in a photometric device. There are light projector elements or light receiver elements contained in inside positions of those windows.

A grip 12 is formed on one lateral face of the instant camera 2. A power switch 13 and a shutter release button 14 are disposed on the top of the grip 12. The shutter release button 14 is depressible in two steps, and when depressed halfway, causes operation of rangefinding and photometry, and when depressed fully, releases a shutter device.

A viewfinder 16 is disposed in an upper portion of the instant camera 2, and used to observe a region to be photographed. When the shutter release button 14 is halfway depressed, rangefinding and photometry are effected through the light projector window 7, the light receiver window 8 and the photometric window 9. Upon full depression of the shutter release button 14, the shutter device inside the lens barrel 6 is released according to rangefinding and photometric values as obtained. If brightness of a photographic subject is very low, then a flash emitter 17 above the lens barrel 6 is automatically operated to emit flash light toward the photographic subject. After taking an exposure, the photo film unit 3 in the course of development is ejected from a camera outlet 18 in the top of the instant camera 2.

Figure 2:
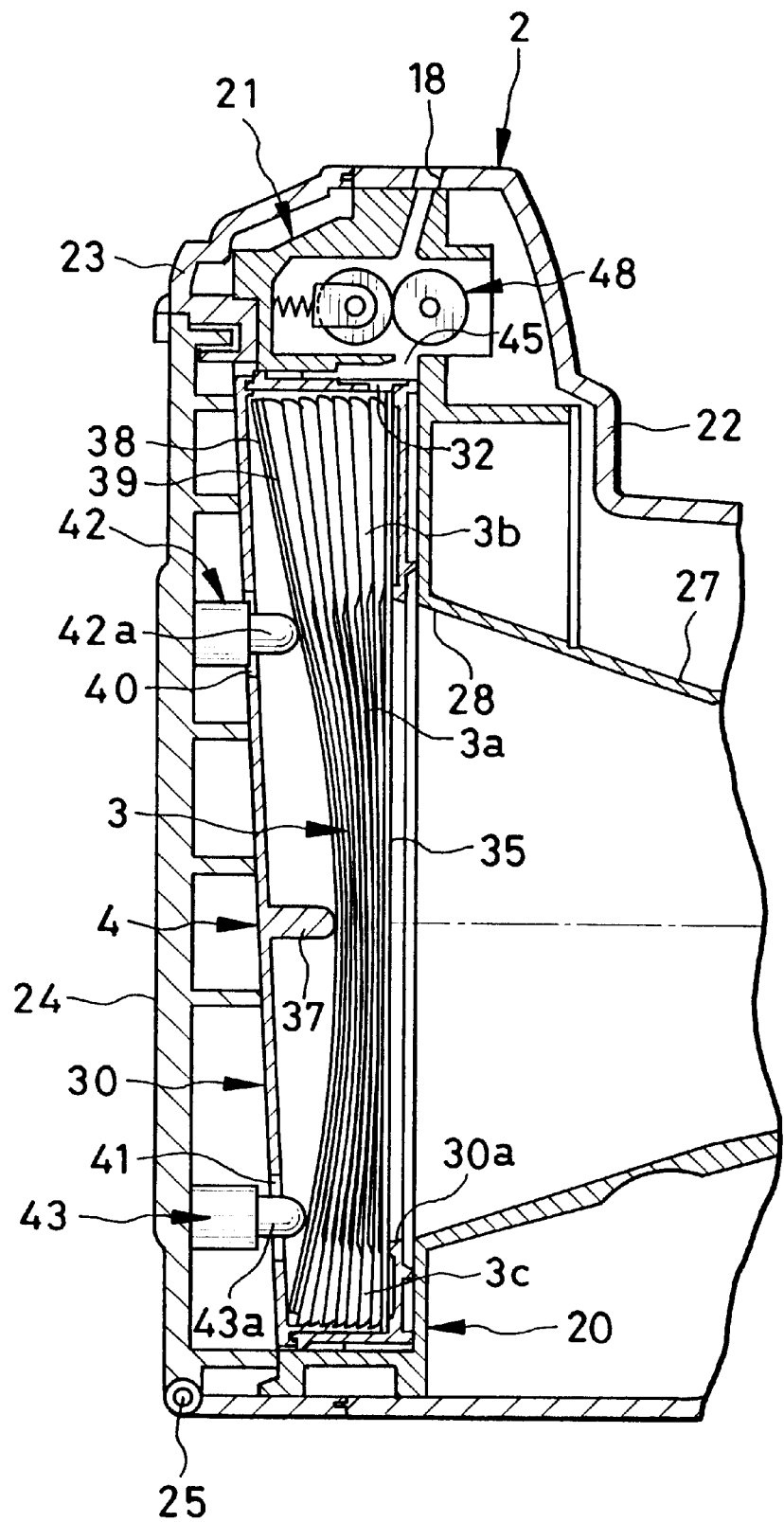
FIG. 2 is a cross section illustrating the instant camera.

In FIG. 2, the instant camera 2 has a body 21, a front cover 22 and a rear cover 23. The body 21 incorporates mechanisms for taking an exposure. A pack chamber 20 is disposed on the rear of the body 21 and loaded with the photo film pack 4. A door 24 of a plate shape is secured to the rear cover 23 with a hinge 25 for opening and closing the pack chamber 20.

A light-shielding tunnel 27 is formed in the front of the body 21, and shields ambient light from an optical path defined from the taking lens 5 to the photo film units 3. An exposure aperture 28 is formed between the pack chamber 20 and the light-shielding tunnel 27 to determine a region to be exposed on the photo film units 3 in the photo film pack 4.

The photo film pack 4 is constituted of a case 30 of plastic material in a box shape and a stack of the photo film units 3 contained in the case 30. The photo film units 3 include an exposure surface 3a, a processing solution pod 3b and a trap member 3c. The exposure surface 3a exists on the front of layers including emulsion layers and a light receiving layer. The solution pod 3b contains processing solution. The trap member 3c traps the surplus of the processing solution having flowed from the solution pod 3b to the exposure surface 3a, and hardens the surplus. The photo film units 3 have a rectangular shape, and is a mono-sheet type, which can be handled as a single sheet.

An exposure opening 30a is formed in the front wall of the case 30 to uncover the exposure surface 3a of the one of the photo film units 3. A photo film outlet 32 in a slit shape is formed in the top of the case 30 for ejecting an exposed one of the photo film units 3 from inside the case 30. A light-shielding sticker 33 with flexibility (See FIG. 3) is attached to close the photo film outlet 32 when the photo film pack 4 is unused.

A light-shielding cover sheet 35 of a plate shape is contained in the photo film pack 4 with the photo film units 3 when the photo film pack 4 is unused, and protects the inside of the case 30 from ambient light. When the shutter is released for the first time after loading the pack chamber 20 with the photo film pack 4, the cover sheet 35 is automatically ejected from the camera outlet 18 in the top of the instant camera 2. In the course of this ejection, a weakly attached portion of the sticker 33 over the photo film outlet 32 is peeled to open the photo film outlet 32.

A recess (not shown) is formed in a portion under the exposure opening 30a in the case 30 for receiving a claw mechanism known in the art. The claw of the claw mechanism is driven in response to shutter releasing, and is moved upwards, enters the recess in the case 30 and contacts a bottom end of a foremost one of the photo film units 3. The claw moves further in the upward direction to lift the foremost photo film unit 3 in the case 30, until a top end of the foremost photo film unit 3 is moved out of the photo film outlet 32 in the case 30.

A push ridge 37 is formed on the center of the rear inside wall of the case 30. Light-shielding sheets 38 and 39 are disposed behind the photo film units 3. The push ridge 37 pushes the photo film units 3 to the front indirectly with the light-shielding sheets 38 and 39, to flatten the foremost one of the photo film units 3. Holes 40 and 41 are formed in the rear of the case 30, between which the push ridge 37 is located. Press pad mechanisms 42 and 43 are arranged on the inside of the door 24, and when the door 24 is closed with the photo film pack 4 inside the pack chamber 20, enter the holes 40 and 41.

The press pad mechanisms 42 and 43 have press pads 42a and 43a, which are disclosed in U.S. Pat. No. 5,541,683 (corresponding to JP-A 7-244336). The press pads 42a and 43a are movable in a direction of the thickness of the photo film units 3, and biased by springs to push the photo film units 3, the foremost one of which is kept flat. The holes 40 and 41 to be entered by the press pad mechanisms 42 and 43 are closed by the light-shielding sheets 38 and 39 lighttightly before the photo film pack 4 is used.

Figure 3:
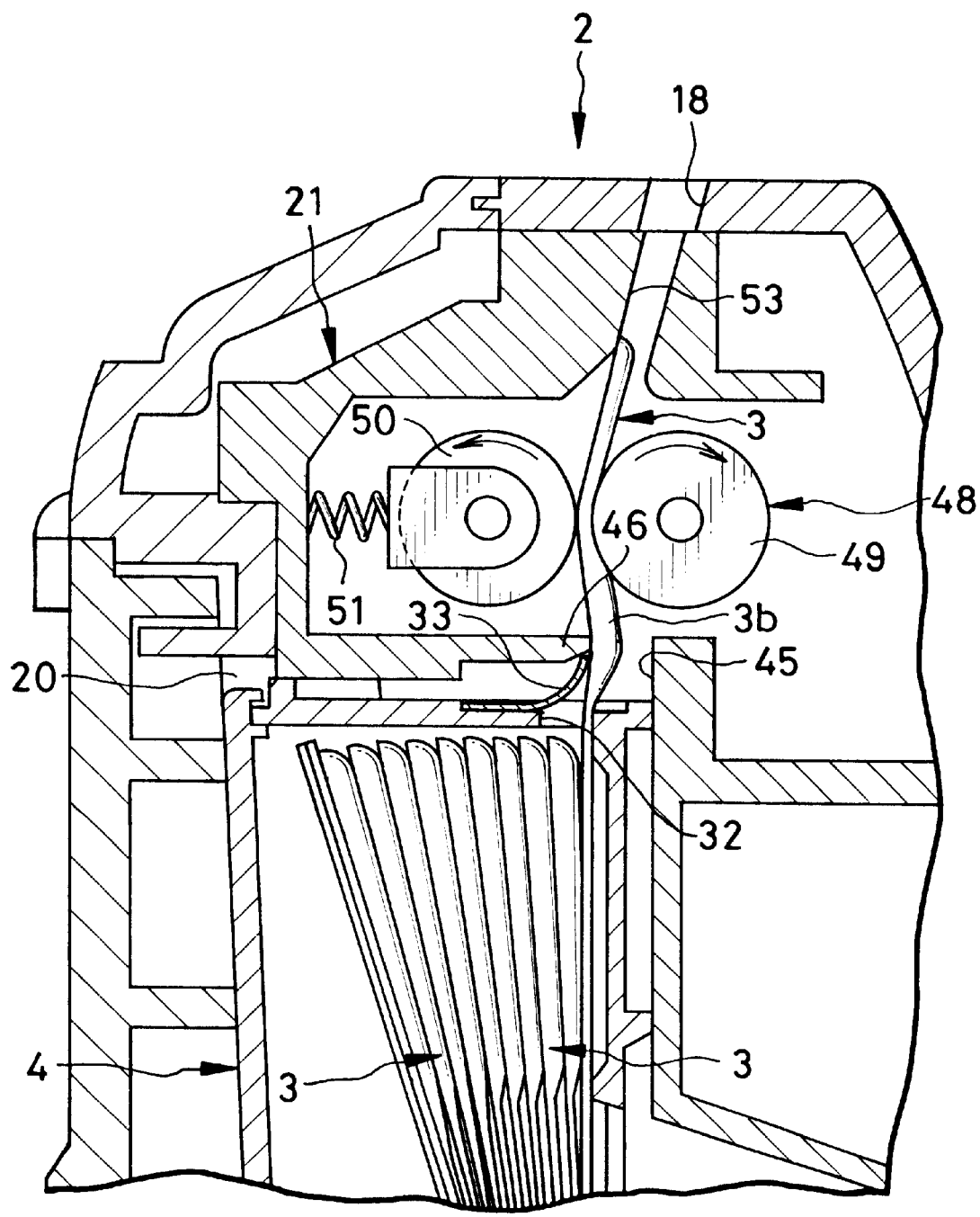
FIG. 3 is a section, partially cutaway, illustrating the instant camera and particularly its spreader rollers and a spread control wall with photo film units.

In FIG. 3, a photo film passageway 45 of a slit shape is formed in the top of the pack chamber 20 to cause the photo film unit 3 to exit from the pack chamber 20 after each exposure. The photo film passageway 45 is in a position offset forwards from the photo film outlet 32 formed in the photo film pack 4. A spread control wall 46 constitutes one of the two edges of the photo film passageway 45, and contacts the back surface of the photo film unit 3 to control the spread state of the processing solution flowing from the solution pod 3b to the exposure surface 3a.

An end of the spread control wall 46 has such a rounded shape as to protect the back surface of the photo film unit 3 from being damaged. A guiding inclined surface is formed on the end of the spread control wall 46 to guide the photo film unit 3 toward the photo film passageway 45.

A spreader roller set 48 is disposed above the photo film passageway 45, and nips an advancing end of the one of the photo film units 3 advancing from the pack chamber 20, and conveys it toward the camera outlet 18. Also the camera outlet 18 squeezes the solution pod 3b and causes the processing solution to flow to the exposure surface 3a, and spreads the solution to the whole of the exposure surface 3a. The spreader roller set 48 is constituted of first and second spreader rollers 49 and 50. The first spreader roller 49 as a driving roller is rotated by a motor in the clockwise direction. The second spreader roller 50 as a driven roller is rotated in the counterclockwise direction by rotation of the first spreader roller 49 via the contact with pressure.

The spreader rollers 49 and 50 are respectively formed from hard steel material to reduce errors in the diameter in relation to the axial direction. The second spreader roller 50 is movable in the thickness direction of the photo film unit 3 to spread the processing solution on the exposure surface 3a in a uniform manner, and is biased by a spring 51 to push the first spreader roller 49. In the present embodiment, the first spreader roller 49 is kept from shifting in its width direction, as the first spreader roller 49 is disposed to cause the photo film unit 3 to be pushed on the spread control wall 46. This is effective in stabilizing a contacting position, contacting pressure, and other contacting states between the photo film unit 3 and the spread control wall 46. Note that, if a driven roller is disposed on the side of pressing the photo film unit 3 to the spread control wall 46, then the driven roller can be kept from shifting, and a driving roller can be set movable in the thickness direction of the photo film unit 3.

The spreader roller set 48 is so disposed that a position of the contact between the spreader rollers 49 and 50 is located directly over the end of the spread control wall 46. As the photo film unit 3 is caused to contact the spreader roller set 48, the spread control wall 46 and an edge of the photo film outlet 32 in the case 30, the photo film unit 3 is curved in an S-shape loosely. A contacting state of the photo film unit 3 with the spread control wall 46 is ensured to make the operation of the spread control wall 46 effective for spreading the processing solution. Note that, in spite of the present embodiment, the position of the contact between the spreader rollers 49 and 50 may be slightly offset from a position directly over the end of the spread control wall 46. The spreader roller set 48 may be positioned in any suitable manner such that the photo film unit 3 is curved loosely to keep the back surface in tight contact with the spread control wall 46. It is preferable that the end of the spread control wall 46 is 0.1 mm offset in the rearward direction from the position where the first spreader roller 49 contacts the photo film unit 3.

A camera outlet passageway 53 is formed with an inclination toward the front, and guides the photo film unit 3 toward the camera outlet 18 after passage in the spreader roller set 48. Thus an area of contact of the first spreader roller 49 with the solution pod 3b of the photo film unit 3 is enlarged. An effect of the first spreader roller 49 for spreading the solution is raised.

The operation of the above construction is described now. To take an exposure with the instant camera 2 in FIG. 1, the power switch 13 is depressed to power the instant camera 2. A photographic field is observed through the viewfinder 16. The shutter release button 14 is depressed halfway, to effect the rangefinding and photometry by use of the light projector window 7, the light receiver window 8 and the photometric window 9 located in the front of the lens barrel 6. When the shutter release button 14 is depressed fully, the shutter device in the lens barrel 6 is released in accordance with the values obtained by the rangefinding and the photometry. If the brightness of the photographic subject is very low, the flash emitter 17 automatically emits flash light toward the photographic subject. The subject light passes through the taking lens 5, and exposes the exposure surface 3a of the foremost one of the photo film units 3 through the light-shielding tunnel 27, the exposure aperture 28 and the exposure opening 30a.

When an operation of releasing of the shutter device is finished, a motor causes the claw of the claw mechanism to move upwards, for the claw to enter the recess communicating with the exposure opening 30a of the case 30. The claw comes in contact with the bottom of the foremost one of the photo film units 3, and then moves up to raise the foremost one of the photo film units 3 inside the case 30.

The photo film unit 3 advanced through the photo film outlet 32 in the case 30 forcibly peels the sticker 33 to exit from the case 30. The photo film unit 3 is guided by the lower inclined face of the spread control wall 46, and directed through the photo film passageway 45 in the pack chamber 20. Then the photo film unit 3 from the photo film passageway 45 is nipped by the spreader roller set 48 which has been rotating, and is conveyed toward the camera outlet 18.

In the course of the movement, the solution pod 3b of the photo film unit 3 is squeezed by the spreader roller set 48. The processing solution flows from the solution pod 3b, and is caused by the spreader roller set 48 to spread on the exposure surface 3a. The photo film unit 3 having passed the spreader roller set 48 is introduced to the outlet passageway 53 having the inclination toward the front of the instant camera 2. As the outlet passageway 53 enlarges the area of the contact between the solution pod 3b of the photo film unit 3 and the first spreader roller 49, the effect of the spreader roller set 46 spreading the solution is ensured.

The processing solution having flowed to the exposure surface 3a is spread by the spreader roller set 48, and at the same time, caused to extend to the whole of the exposure surface 3a with a uniform thickness by an effect of the spread control wall 46 contacting the back surface of the photo film unit 3. The spread control wall 46 is formed with the body 21 constituting the instant camera 2. As a position of the first spreader roller 49 is stationary in the body 21 on the side opposing to the spread control wall 46, the contacting state between the photo film unit 3 and the spread control wall 46 is kept unchanged, to stabilize the spread state of the processing solution.

As the spread control wall 46 is included in walls of the pack chamber 20 to constitute the photo film passageway 45, it is possible to use the spread control wall 46 without raising the size or cost of the camera. Furthermore the spread control wall 46 contacts the back surface of the photo film unit 3 in reverse to the exposure surface 3a, which can be prevented from being damaged or contaminated.

The photo film unit 3 having passed the outlet passageway 53 is ejected through the camera outlet 18 from the instant camera 2. As the exposure surface 3a of the photo film unit 3 is processed by the processing solution spread by the spread control wall 46 and the spreader roller set 48, a printed image appears on the exposure surface 3a when a predetermined time lapses. The quality of the printed image of the photo film unit 3 is heightened because the area of the contact between the solution pod 3b and the spreader roller set 48 is enlarged.

In the above embodiment, the spread control wall is formed to constitute the photo film passageway 45. Alternatively a spread control wall may be formed with a different part associated with the spreader rollers, either inside the pack chamber 20 or outside the pack chamber 20. An end portion of the spread control wall can be shaped with modifications in its width direction so as to optimize the spreading effect of the processing solution.

In a preferred embodiment, the photo film units 3 have a preferable size which is substantially equal to a size of the ID-1 type card being 85.60 mm long and 53.98 mm wide, which is defined according to JIS X6301 or ISO 7810. Furthermore a ratio of an area of a frame region of the photo film units 3 to an area of their margin region is equal to or more than 1.50. These features are hereinafter described with reference to FIGS. 4–7.

Figure 6:
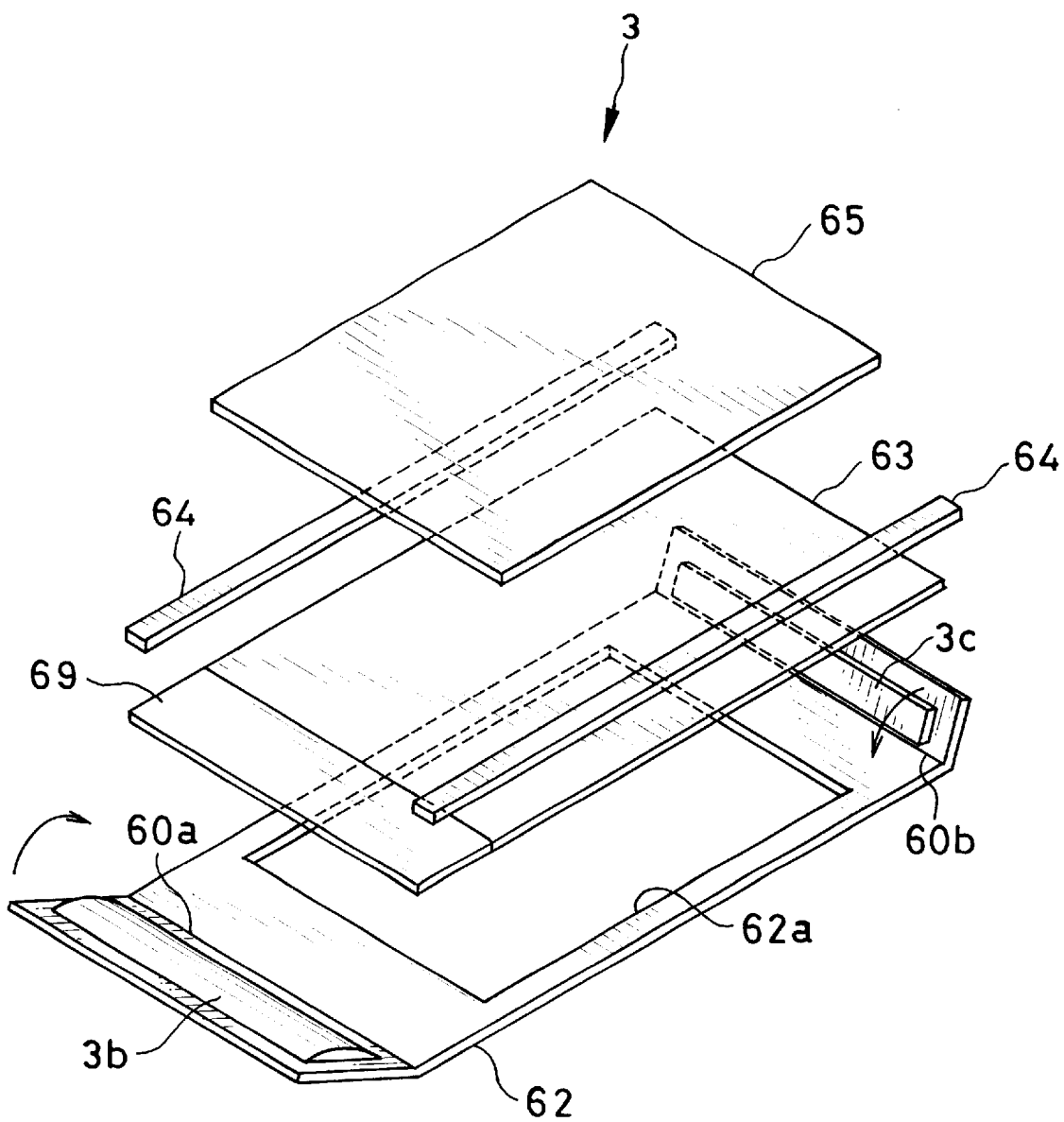
FIG. 6 is an exploded perspective illustrating the photo film unit.

In FIG. 6, the photo film unit 3 has a structure including a mask sheet 62, a photosensitive sheet 63, a pair of spacer rail members 64 and a cover sheet 65 connected sequentially with one another. A frame opening 62a is formed in the center of the mask sheet 62. The solution pod 3b and the trap member 3c are attached to outer portions which are on the periphery of the mask sheet 62 and defined by bend lines 60a and 60b. After the photosensitive sheet 63, the spacer rail members 64 and the cover sheet 65 are attached to the mask sheet 62, the outer portions of the mask sheet 62 are bent along the bend lines 60a and 60b and are attached to the cover sheet 65. The trap member 3c is attached to the mask sheet 62 with adhesive agent. An under member 69 or pad is connected with the photosensitive sheet 63 on the side of the solution pod 3b, and operates to adjusts the height of the solution pod 3b and the photosensitive sheet 63 by receiving the solution pod 3b.

The mask sheet 62 operates to define the periphery of each frame, and has a thickness of 50 $\mu$m. The mask sheet 62 includes a support, which consists of lamination of first and second films, the first being a transparent polyethylene terephthalate (PET) film with a thickness of 12 $\mu$m, and the second being a polyethylene terephthalate (PET) film having a deposit of aluminum and with a thickness of 12 $\mu$m. A first surface of the support is coated with an adhesive layer of an EVA-SBS type at a thickness of approximately 12 $\mu$m. The second surface of the support is coated with a white-color layer and then coated with a logo-printing layer. The white-color layer includes titanium oxide and silica, and has a thickness of approximately 8 $\mu$m. The logo-printing layer is gray.

The spacer rail members 64 are produced from material for controlling the thickness with which the processing solution is spread, and for attaching the cover sheet 65 to the photosensitive sheet 63, and have an average thickness of 64 $\mu$m. Transparent sheets of polyethylene terephthalate (PET) with a thickness of 38 $\mu$m are used. A first surface of the transparent sheets is coated with a light-shielding layer at a thickness of 10 $\mu$m and then coated with an adhesive layer of an EVA-SBS type a t a thickness of 8 $\mu$m. The second surface of the transparent sheets are coated with an adhesive layer of an EVA-SBS type at a thickness of 8 $\mu$m. It is to be noted that the thickness or formulation of the adhesive layers may be changed as required, in order to ensure the adhesion on the side of the photosensitive sheet. As the sum of the thickness of the two adhesive layers should be unchanged, one of the adhesive layers must have a decreased thickness if the other of the adhesive layers must have an increased thickness.

The photosensitive sheet 63 includes a polyethylene terephthalate (PET) support which is 90 $\mu$m thick and includes titanium oxide of a small amount. A first surface of the support is coated with a back layer of an acetyl cellulose type. The second surface of the support is coated sequentially with an image receiving layer, a white-color reflection layer, a light-shielding layer, a red-sensitive emulsion layer, a green-sensitive emulsion layer, a blue-sensitive emulsion layer, a ultraviolet ray absorbing layer, and then a protective layer. A color mixture preventing layer is disposed respectively between those sensitive emulsion layers. A thickness of the entirety of the photosensitive sheet 63 is approximately 115 $\mu$m.

The cover sheet 65 includes a polyethylene terephthalate (PET) support which is 70 $\mu$m thick and includes blue dye of a small amount. A first surface of the support is coated with a filter dye layer of an acetyl cellulose type. The second surface of the support is coated with a neutralizing layer, a neutralizing timing layer, and then a temperature compensating layer. The whole thickness of the cover sheet 65 is approximately 80 $\mu$m.

Figure 7:
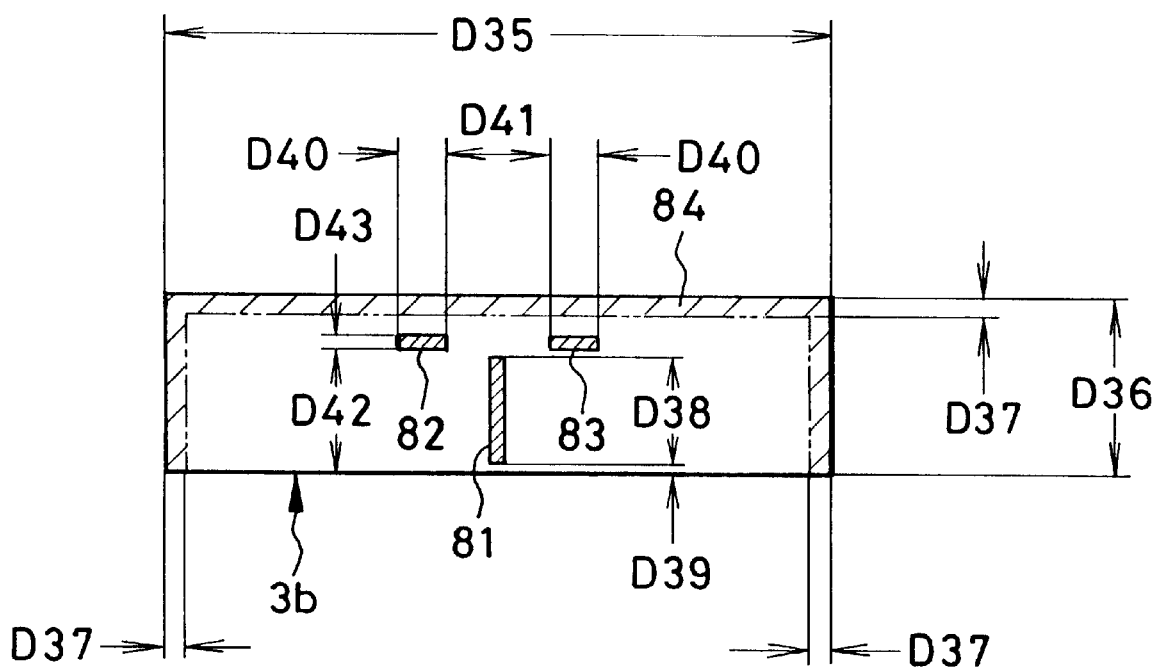
FIG. 7 is an explanatory view in elevation, illustrating a processing solution pod section of the photo film unit.

The solution pod 3b includes processing solution of 280 microliters ($\mu$l) and a container member for containing the processing solution. The container member consists of a paper support and an aluminum foil attached thereto by adhesion, and coated with adhesive agent of an EVA type. In FIG. 7, the solution pod 3b is provided with middle sealed portions 81, 82 and 83. Edges of the container member from which the processing solution exits are sealed with a weak sealed portion 84, which is indicated by the hatching in the drawing. The middle sealed portions 81–83 are disposed for uniforming the spreading of the processing solution when the solution pod 3b flows out upon breakage of the weak sealed portion 84. The trap member 3c has a width of 3.6 mm, a length of 45 mm, and a thickness of 0.75 mm. The under member 69 is a transparent polyethylene terephthalate (PET) film having a thickness of 100 $\mu$m.

Figure 4:
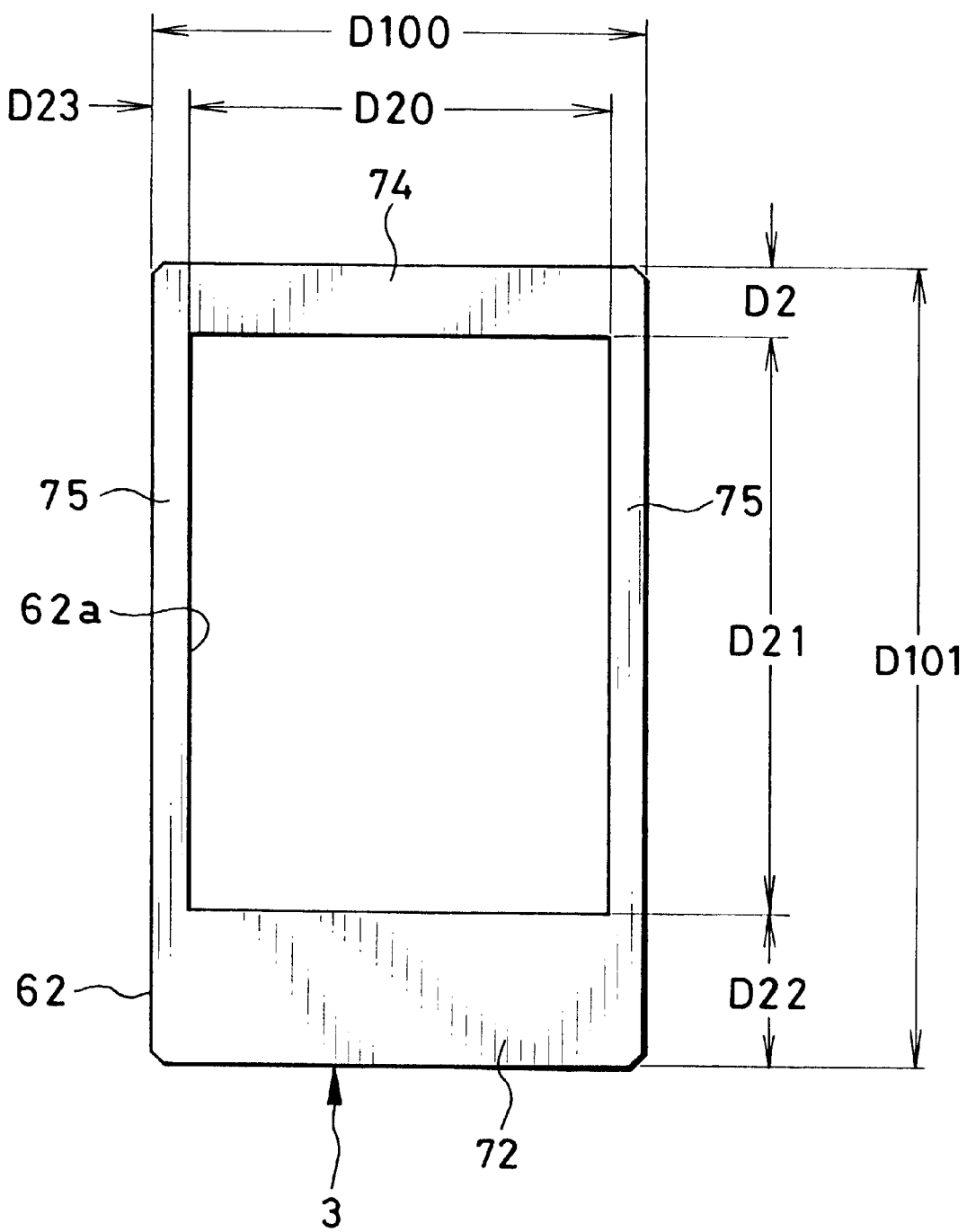
FIG. 4 is a front elevation illustrating each one of the photo film units.

In FIG. 4, the photo film unit 3 on the side of the exposure surface 3a is illustrated. The frame opening 62a in which an image appears has a size of D20×D21. A pod section 71 (See FIG. 5) containing the solution pod 3b is reverse to a blank margin space 72 of the mask sheet 62 which is used by users for filling in words or the like. A trap section 73 or T-section (See FIG. 5) containing the trap member 3c is reverse to a horizontal portion 74 or T-frame of the mask sheet 62. The spacer rail members 64 are behind lateral portions 75 of the mask sheet 62. The blank margin space 72 has a width of D22. The horizontal portion 74 has a width of D2. The lateral portions 75 have a width of D23.

In FIG. 5A, let D1 be a distance between an end of the photosensitive sheet 63 and an end of the mask sheet 62 before bending of the mask sheet 62. In FIG. 5B, let D3 be a distance between the end of the mask sheet 62 and an end 62c of the photo film unit 3. The distance D1 is determined longer than the distance D3 for facilitating bending of the mask sheet 62 with the surplus length. If the difference between D1 and D3 is too great, the mask sheet 62 will be so bent that the distance to the end of the mask sheet 62 will become over a distance D2 between the end 62c and an end of the frame opening 62a. Thus a value of D1–D3 should be within a range between upper and lower limits, and in the present embodiment, is determined 0.6 mm.

Let D4 be a distance between the end 62c and an end of the trap member 3c. Let D5 be a distance between the trap member 3c and a position where the cover sheet 65 is connected with the end of the mask sheet 62 near to an air path 77 depicted in FIG. 5. The distances D4 and D5 depend upon a size of the trap member 3c and a position of attachment of the trap member 3c. The distance D4 is 1.0 mm for the purpose of preventing the solution from spreading laterally and from returning to the inside of the frame. The distance D5 is 1.30 mm for the purpose of sufficiently introducing air inside the photo film unit to the air path 77.

Figure 5:
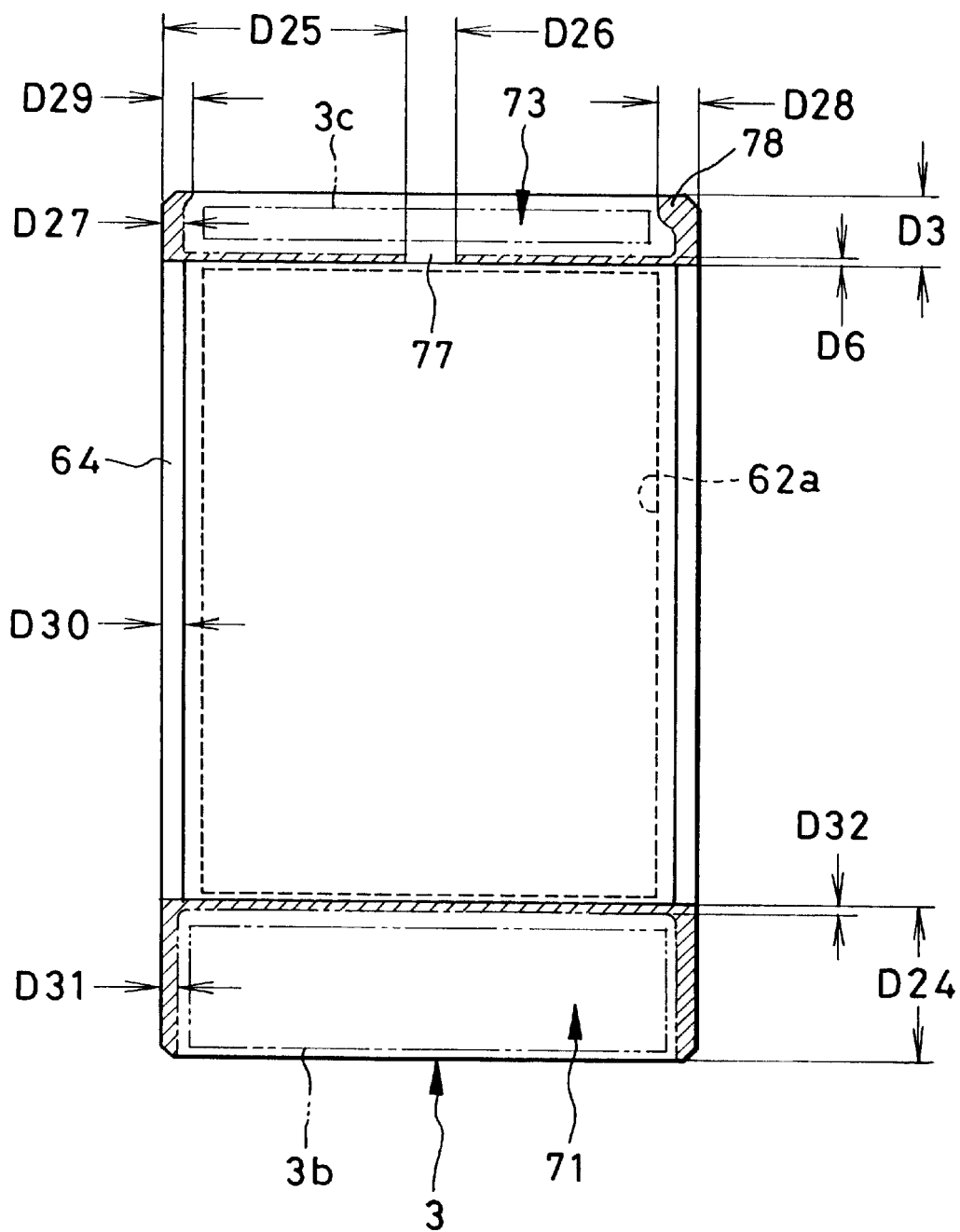
FIG. 5 is a rear elevation illustrating the photo film unit.

In FIG. 5, the back surface of the photo film unit 3 is illustrated. The air path 77 is defined by keeping a central portion of the trap section 73 without being sealed. The air path 77 is in a position D25 away from a lateral side of the photo film unit 3, and D25=24.5 mm. The air path 77 has a width D26=5 mm. Let D6 be a sealed width of the trap section 73 on the photosensitive sheet side. Let D27 be a sealed width of the trap section 73 on each lateral side. D6=0.8 mm, and D27=2.2 mm. Let D29 be a sealed width at the corner of a first one of the lateral sides of the trap section 73. Let D28 be a sealed width at a corner 78 of the second one of the lateral sides of the trap section 73. D29=3 mm, but D28=4.0 mm, because the corner 7B is engageable with the claw mechanism of the instant camera. The spacer rail members 64 have a width D30=2.2 mm. Let D24 be a bend width of the pod section 71. Let D31 be a sealed width of the pod section 71 one each lateral side. Let D32 be a sealed width of the pod section 71 on the side of the photosensitive sheet. D24=15.4 mm, D31=1.8 mm, and D32=0.8 mm.

In FIG. 7, let D35 be a length of the solution pod 3b. Let D36 be a width of the solution pod 3b. Let D37 be a width of the weak sealed portion 84. Let D38 be a length of the middle sealed portion 81. Let D39 be an interval between the middle sealed portion 81 and an edge of the solution pod 3b. Let D40 be a length of the middle sealed portions 82 and 83. Let D41 be an interval between the middle sealed portions 82 and 83. Let D42 be an interval between the edge of the solution pod 3b oriented away from the frame opening 62a and the middle sealed portions B2 and B3. Let D43 be a width of the middle sealed portions 82 and 83. Those sizes are determined as D35=48.6 mm, D36=12.5 mm, D37=1.5 mm, D38=7.5 mm, D39=0.55 mm, D40=3.5 mm, D41=7.6 mm, D42=8.55 mm, and D43=1 mm.

Examples 1–4 are indicated in the table below. The trap section 73, which is a thickest portion of the photo film unit 3 after the spreading, has a thickness of 0.9 mm.

|  | Examples | | | |
| --- | --- | --- | --- | --- |
|  | 1 | 2 | 3 | 4 |
| Frame-to-margin area ratio | 1.61 | 1.80 | 1.50 | 1.42 |
| Frame area (cm$^2$) | 28.5 | 29.7 | 27.8 | 27.1 |
| Margin area (cm$^2$) | 17.7 | 16.5 | 18.4 | 19.1 |
| Frame size D20 × D21 (mm) | 46 × 62 | 47 × 63.1 | 46 × 60.4 | 46 × 59 |
| Width D2 of horizontal portion 74 (mm) | 7.6 | 6.5 | 8.2 | 9.6 |
| Width D22 of blank margin space 72 (mm) | 16.0 | 16.0 | 17.0 | 17.0 |
| Width D23 of lateral portions 75 (mm) | 4.0 | 3.5 | 4.0 | 4.0 |

In Example 4, the frame-to-margin area ratio is 1.42, and is the smallest among those of Examples 1–4. A length D21 of the longer side of the frame is smaller by 1.4 mm than that in Example 3. In view of the size of the photo film unit as large as the ID-1 type card, the frame size of Example 4 is regarded as a lower limit to be used for photographing a scene of plural people, or photographing a scene at a far distance.

According to Examples 1–4, the photo film unit has the size equal to that of the ID-1 card standardized by JIS X6301 or ISO 7810, and has the ratio of the area of the frame region to the area of the margin region equal to or more than 1.50. Consequently the photo film unit can have a frame region with such a sufficient size that, if a number of people are photographed in a single frame, each of them can be easily recognized on the obtained photographic print. Of course the entirety of the photo film unit can have such a size that the photo film unit can be handled easily and with much portability, as it can be contained in a purse or card holder.

As the photo film units 3 are combined with the use of the spread control wall 46 in the present invention, the spreading of the processing solution is uniformed in the width direction of the photo film units 3. Thus the image quality in a print to be obtained can be increased. The processing solution can be spread with high efficiency. In other words, a frame region of the photo film units 3 for recording an image is set determined relatively large in comparison with that according to the prior art, because of reduced volumes of the solution pod 3b for enclosing the processing solution and the trap member 3c for capturing the surplus solution. This structure is specifically effective in the photo film units 3 having a small size, as the frame region of the photo film units 3 should be kept as large as possible for the purpose of good operation of the photo film units 3 to be commercially handled.

Of course any size can be determined in the present invention for the photo film units 3, in compliance with which structures in the instant camera 2 can be designed suitably.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An instant camera having a pack chamber loadable with a photo film pack, wherein said photo film pack has a plurality of photo film units of a self-processing type, a case contains said photo film units, each of said photo film units includes a solution pod and an exposure surface, said exposure surface is processed by spreading of processing solution from said solution pod after being exposed by photographic subject light, and said photo film units are respectively ejected through a photo film outlet in said case, said instant camera comprising:

a spreader roller set, constituted by first and second spreader rollers, for pressing and conveying an exposed one of said photo film units advanced from said pack chamber, said spreader roller set squeezing said solution pod to spread said processing solution on said exposure surface;

a spread control member, disposed between said photo film outlet and said spreader roller set and being integral with said pack chamber, for pushing said one photo film unit in a first direction perpendicular to an advance thereof during said advance, to control distribution of said processing solution on said exposure surface; and a photo film passageway, formed in said pack chamber, and positioned offset from a line extending from said photo film outlet to a position between said first and second spreader rollers.

2. An instant camera as defined in claim 1, wherein said pack chamber includes a photo film passageway for passing said one photo film unit advanced from said photo film outlet toward said spreader roller set;

said spread control member is one of two walls defined in said photo film passageway, and at least partially covers said photo film outlet.

3. An instant camera as defined in claim 2, wherein said spread control member includes an inclined face, disposed on an end thereof, opposed to said photo film outlet, for guiding a front end of said one photo film unit being advanced toward said spreader roller set.

4. An instant camera as defined in claim 2, wherein said spread control member is so disposed as to bend said one photo film unit convexly in said first direction between said photo film outlet and said spreader roller set.

5. An instant camera as defined in claim 4, further comprising a camera outlet, disposed outside said spreader roller set, for ejecting said photo film unit externally from said instant camera, said camera outlet being positioned offset from a position between said first and second spreader rollers, to push said one photo film unit in said first direction.

6. An instant camera as defined in claim 5, wherein said first spreader roller is movable in said first direction, is biased by a spring, and applies regular force of pressurization to said one photo film unit in cooperation with said second spreader roller;

said spread control member is disposed on a side of said first spreader roller with respect to said photo film outlet.

7. An instant camera as defined in claim 1, further comprising a camera outlet for ejecting said one photo film unit externally from said instant camera after having passed said spreader roller set, wherein said one photo film unit is bent in an S-shape by said camera outlet, said spreader roller set, said photo film passageway and said photo film outlet while advanced.

8. An instant photographic system for use with an instant camera having a pack chamber loadable with a photo film pack, wherein said photo film pack has a plurality of photo film units of a self-processing type, a case contains said photo film units, each of said photo film units includes a solution pod and an exposure surface, said exposure surface is processed by spreading of processing solution from said solution pod after being exposed by photographic subject light, and said photo film units are respectively ejected through a photo film outlet in said case, said instant photographic system comprising:

said instant camera including:

(A) a spreader roller set, constituted by first and second spreader rollers, for pressing and conveying an exposed one of said photo film units advanced from said pack chamber, said spreader roller set squeezing said solution pod to spread said processing solution on said exposure surface;

(B) a spread control member, disposed between said photo film outlet and said spreader roller set and being integral with said pack chamber, for pushing said one photo film unit in a first direction substantially perpendicular to an advance thereof during said advance, to control distribution of said processing solution on said exposure surface; and a photo film passageway, forned in said pack chamber, and positioned offset from a line extending from said photo film outlet to a position between said first and second spreader rollers, wherein said photo film units have a size substantially equal to a width of 85.60 mm and a height of 53.98 mm, and the ratio of an area of a frame region of the photo film unit to an area of their margin region is equal or more than 1.50.

\* \* \* \* \*